US007451438B2

(12) United States Patent
Kielstra et al.

(10) Patent No.: US 7,451,438 B2
(45) Date of Patent: Nov. 11, 2008

(54) METHOD, SYSTEM AND PRODUCT FOR IDENTIFYING AND EXECUTING LOCKED READ REGIONS AND LOCKED WRITE REGIONS IN PROGRAMMING LANGUAGES THAT OFFER SYNCHRONIZATION WITHOUT EXPLICIT MEANS TO DISTINGUISH BETWEEN SUCH REGIONS

(75) Inventors: Allan Henry Kielstra, Ajax (CA); Kevin James Langman, Maple (CA)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 11/012,364

(22) Filed: Dec. 15, 2004

(65) Prior Publication Data

US 2005/0198626 A1    Sep. 8, 2005

(30) Foreign Application Priority Data

Dec. 19, 2003   (CA) .................................... 2453714

(51) Int. Cl.
*G06F 9/45* (2006.01)
(52) U.S. Cl. ...................................... 717/154; 717/155
(58) Field of Classification Search ................. 717/154, 717/155
See application file for complete search history.

(56) References Cited

U.S. PATENT DOCUMENTS

| | | | |
|---|---|---|---|
| 6,029,190 A | 2/2000 | Oliver | 709/107 |
| 6,343,375 B1 * | 1/2002 | Gupta et al. | 717/152 |
| 6,345,313 B1 * | 2/2002 | Lindholm | 719/315 |
| 6,487,716 B1 * | 11/2002 | Choi et al. | 717/159 |
| 2003/0126187 A1 | 7/2003 | Won et al. | 709/107 |

OTHER PUBLICATIONS

Bogda, J. "Detecting Read-Only Methods in Java", LCR 2000, May 25-27, 2000, pp. 143-154.

* cited by examiner

Primary Examiner—Tuan Q. Dam
Assistant Examiner—Andrew Chou
(74) Attorney, Agent, or Firm—Hamilton & Terrile, LLP; Stephen A. Terrile

(57) ABSTRACT

A technique for identifying and executing synchronized read regions and synchronized write regions is provided. The technique processes program code with a software tool to convert the code to an internal representation for the software tool and constructs a control flow graph of code blocks which also identifies the entry and exit points for each region of code subject to a lock. For each code block in the control flow graph, visibility analysis is performed. Each determined entry and exit point is moved to enclose the smallest set of code blocks subject to a lock which can be achieved without altering code semantics. A set of trees is created to represent the manner in which the synchronized regions are nested. If the tree contains at least one block previously identified, then the tree is marked a write. Otherwise, the tree is marked a read tree. A write lock is then created for the region in each tree identified as a write tree and a read lock is created for the regions in each tree identified as a read tree.

11 Claims, 2 Drawing Sheets

METHOD, SYSTEM AND PRODUCT FOR IDENTIFYING AND EXECUTING LOCKED READ REGIONS AND LOCKED WRITE REGIONS IN PROGRAMMING LANGUAGES THAT OFFER SYNCHRONIZATION WITHOUT EXPLICIT MEANS TO DISTINGUISH BETWEEN SUCH REGIONS

BACKGROUND OF THE INVENTION

1. Field of the Invention

The present invention relates to computer systems. More specifically, the present invention relates to identifying and executing locked read and write regions in programming languages that offer synchronization but which do not offer explicit means to distinguish between such regions.

2. Description of the Related Art

Many modern operating systems allow for the simultaneous execution of multiple processes within an application and these executing processes are typically referred to as threads. As will be apparent to those of skill in the art, in single processor systems threads in fact are not executed simultaneously, but instead share the processor between themselves and other applications being executed on the processor, but this sharing of the processor is largely transparent to users and to programmers who treat it as a logical simultaneity, and is not generally a consideration to the discussion herein. Thus, the discussion herein uses the term simultaneously in its logical sense rather than its literal sense and the present invention can function on single processor or multiprocessor computer systems.

An application may have many threads executing simultaneously and these threads share the resources, particularly the memory space, of the application. Thus, care must be taken by the programmer of the application to ensure that resource contention issues do not result in unexpected or undesired behaviors by their application. In particular, circumstances wherein one thread of an application is writing to an address in memory while another thread is reading from that same address must be avoided, otherwise indeterminate and/or incorrect results and behaviors may occur.

Many programming languages which provide threads also provide memory locking mechanisms to prevent such memory state uncertainties. In the Java™ programming language, the synchronized keyword provides a locking scheme that gives controlled access to sections of the Java code. Java is a trademark of Sun Microsystems, Inc. The synchronized keyword can be applied to methods or blocks of code in a method and operates such that the first time a thread enters the synchronized code, a lock is obtained against a particular Java object. As long as that thread holds the lock on that object, no other thread can obtain a lock on the same object and thus no other thread can enter a synchronized method or block using the same object. The synchronized keyword provides the means for a programmer to give the thread holding the lock a consistent view of the contents of one or more memory addresses by preventing other threads from executing code that may change the memory addresses in question before the lock is released.

While locking mechanisms such as Java's synchronized keyword are well known, they can suffer from disadvantages. For example, Java's synchronized keyword does not differentiate between synchronized methods which read from fields and synchronized methods which write to fields. As will be apparent, a thread executing synchronized code which merely reads from fields need not prevent other threads from reading from those same fields, but does need to prevent any threads which wish to write to those fields from doing so while reads are occurring. Conversely, a thread executing synchronized code which writes to a field must prevent any other thread from writing to that field and any other thread from reading from that field until the first thread has exited that synchronized code.

As Java's synchronized mechanism does not make a differentiation between synchronized code that merely reads from fields versus code that writes to fields, threads can be blocked from executing which, in fact, need not be blocked and execution of applications are thus less efficient than might otherwise be the case as threads can be needlessly waiting to be allowed to execute. Further, it is common practice to synchronize entire methods in Java which often causes synchronization to be in effect on instructions that are neither read nor write fields. Thus, often locks are invoked more often than is necessary during execution of the program and have longer durations than necessary.

The problems with Java's synchronized keyword are known and attempts to analyze the performance impact of these problems have previously been made. One such analysis is described in, "Detecting Read-Only Methods in Java", Jeff Bogda, LCR 2000, May 25-27, 2000, pages 143-154.

Bogda performs a static, whole program analysis, wherein the complete call graph is known, to examine Java synchronized methods. Bogda determines if a method is a read method or a write method. As a result of his analysis, Bogda has found that approximately 31% of methods in the SUN™ JDK 1.2 core libraries are read-only methods. Bogda's findings show that an improvement to thread performance in Java could be achieved with an improved synchronized mechanism. However, Bogda does not teach how to identify and implement locks for read methods and write methods when performing less than a static whole program analysis. Further, Bogda only considers the read or write status of entire methods designated as being synchronized.

There is needed a method for identifying and executing synchronized read and write regions in programming languages that offer synchronization but which do not offer programmers means to explicitly distinguish between such regions.

SUMMARY OF THE INVENTION

According to a first aspect of the present invention, there is provided a method for identifying and executing synchronized read regions and synchronized write regions in programming languages that offer synchronization but which do not offer programmers means to explicitly distinguish between such regions, comprising the steps of: (i) processing the code of the program with a software tool to convert the code to an internal representation for the software tool; (ii) constructing a control flow graph of code blocks which also identifies the entry and exit points for each region of code subject to a lock; (iii) for each code block in the control flow graph, performing visibility analysis to identify the code blocks whose execution by a thread will be visible to other threads and/or whose execution may examine fields of the synchronized objects; (iv) moving each determined entry and exit point to enclose the smallest set of code blocks subject to a lock which can be achieved without altering the semantics of the code of the program; (v) creating a set of trees to uniquely represent the manner in which the synchronized regions are nested; (vi) for each tree created in (v), if the tree contains at least one block identified in step (iii) then marking the tree a write tree and otherwise marking the tree a read tree; and (vii) creating a write lock for the regions in each tree identified as a write tree and creating a read lock for the regions in each tree identified as a read tree.

Preferably, the visibility analysis of step (iii) is performed by the technique of Escape Analysis. Also preferably, the programming language is Java. Also preferably, step (iii) further includes, for blocks upon which visibility analysis cannot be performed, checking for predetermined information similar to what would be obtained from visibility analysis and, if the information is present, identifying the block accordingly. The predetermined information can be determined empirically or explicitly by the author of the block. Also preferably, step (iv) further includes transforming code to move the lock for regions whose execution depends upon a conditional statement to a point after the conditional statement has been evaluated provided that the evaluation of the conditional statement does not require the use of any field of an object subject to the lock.

According to another aspect of the present invention, there is provided a system for efficiently executing threads in a program written in a language offering only a lock mechanism undifferentiated between read locks and write locks, the system comprising: a code analyzer to process the code of the program to convert the code to code in an internal representation for execution by the system; a control flow analyzer to construct a control flow graph of code blocks which also identifies the entry and exit points for each region of code subject to a lock; a visibility analyzer to, for each block in the control flow graph, identify the blocks which are write blocks and the blocks which are read blocks; a code reorganizer to move each determined entry and exit point to enclose the smallest set of code blocks which can be achieved without altering the semantics of the programs source code; a tree constructor to construct a set of trees, each tree in the set representing a unique nested set of synchronized regions; and a lock generator which considers each tree created by the tree constructor in turn to determine if the tree under consideration contains at least one block identified by the visibility analyzer as a write block and generating a write lock for each region in a tree which contains such an identified block and generating a read lock for each region in a tree which does not contain such an identified block.

Preferably, the visibility analyzer employs Escape Analysis to determine if blocks are write blocks or read blocks. Also preferably, the visibility analyzer further considers predetermined information provided with the code to determine visibility. Preferably, the system is a Java Just In Time compiler. Also preferably, the code reorganizer further operates to transform code to move a lock for regions whose execution depends upon a conditional statement to a point after the conditional statement has been evaluated provided that the evaluation of the conditional statement does not require the use of any field of an object subject to the lock According to yet another aspect of the present invention, there is provided an article of manufacture, comprising a computer usable medium for causing a computing system to provide write and read locks for threads in programs written in a language offering only an undifferentiated lock, the article having: computer readable program code means for causing the computer system to process the source code of the program to convert the source code to code in an internal representation; computer readable program code means for causing the computer system to construct a control flow graph of code blocks which also identifies the entry and exit points for each region of code subject to a combined read and write lock; computer readable program code means for causing the computer system to, for each block in the control flow graph perform visibility analysis to identify write blocks and read blocks; computer readable program code means for causing the computer system to move each determined entry and exit point to enclose the smallest set of code blocks which can be achieved without altering the semantics of the code of the program; computer readable program code means for causing the computer system to create a set of trees uniquely representing nested sets of synchronized regions; computer readable program code means for causing the computer system to mark each tree containing at least one identified write region a write tree and otherwise mark the tree a read tree; and computer readable program code means for causing the computer system to create write locks for the code regions in each tree identified as a write tree and to create read locks for the code regions in each tree identified as a read tree.

BRIEF DESCRIPTION OF THE DRAWINGS

Preferred embodiments of the present invention will now be described, by way of example only, with reference to the attached Figures, wherein.

DESCRIPTION OF THE PREFFERED EMBODIMENTS

Figure 1:
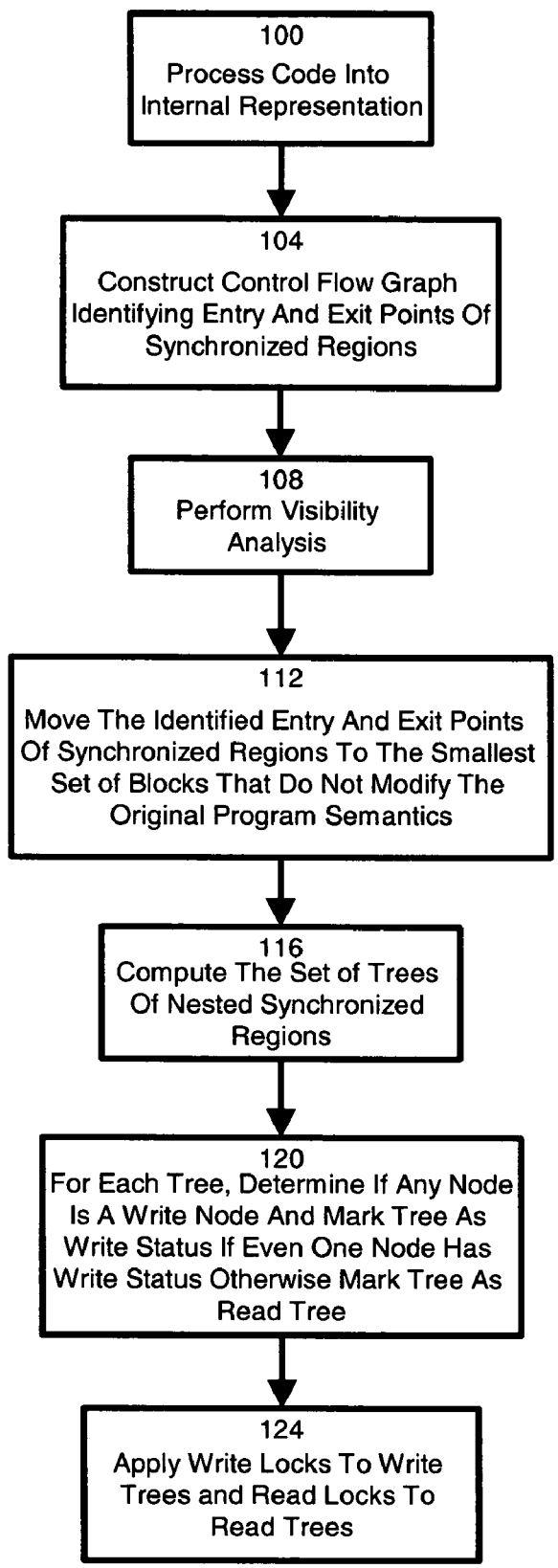
FIG. 1 shows a flowchart of a method in accordance with the present invention.

The following description discusses the Java programming language as an example of a program language wherein the present invention can be advantageously employed. However, the present invention is not limited to use with the Java programming language and it is instead contemplated by the inventors that the present invention can be advantageously employed with any programming languages that offer synchronization of threads but which do not offer programmers means to explicitly distinguish between synchronized regions that only require a guaranteed consistent view of memory versus synchronized regions that will be writing to memory as well.

In the present invention, application code is first examined by a software tool, such as a Just In Time compiler (JIT), to identify write regions, read regions and neutral regions. A block is a segment of code with a single entry and a single exit and a block may contain invocations of other methods. A region can comprise an entire method or one or more arbitrary blocks of code within a method. A synchronized region is a collection of blocks and a single synchronization operation is associated with each synchronized region.

A read region is a segment of code whose execution cannot be observed by another thread. In other words, execution of a read region only affects fields local to that region or fields of objects that are not escaped, as discussed below, from that region and execution of the region by a thread cannot not affect fields that are visible to any other thread.

A write region is a segment of code whose execution can be observed by another thread. In other words, execution of a write region can modify fields that are accessible by other threads.

A neutral region is a segment of code that is neither a read nor a write region. A neutral region is a segment of code whose execution does not read or write any field of a synchronized object under consideration. As described below, neutral regions are employed in the present invention to reduce the size of the regions which are subject to locking.

In the above-mentioned Bogda paper, read and write methods are identified by traversing the complete static call graph, performing various analysis phases, including a shape analysis, a thread-escape analysis and a read-writer analysis, each of which is described in some detail in Bogda.

The present embodiment of the instant invention is implemented in a JIT, or similar software tool, and the static call graph is not, and generally cannot be, traversed. Instead, a different analysis process is employed in the present invention to determine: the visibility to other threads of a thread executing a region of code and; regions of code whose execution may examine fields of the objects synchronized by the code. As used herein, this analysis is referred to as a visibility analysis and, in a present embodiment of the invention, this visibility analysis, which determines if synchronized regions are neutral regions, write regions or read regions, is performed via Escape Analysis. The specific implementation presently employed for the visibility analysis is a modified form of known Escape Analysis, an example of which is described in "Compositional Pointer and Escape Analysis for Java Programs", Whaley and Rinard, OOPSLA '99, 11/99, Denver Colo., USA, pages 187-206.

In Escape Analysis, when considering a region of Java code such as:

```
void first( ) {
    x = new X( );
    dosomething (x);
}
``` a determination must be made as to whether, when dosomething( ) is called, it is possible that the object passed to it as parameter (in this example "x"), is made visible to any thread other than the one currently executing this region. For example, if dosomething( ), or something that dosomething() calls in turn, assigns x to a static field, then x can be visible to other threads. In such a case, x would be considered to have "escaped" from the thread to the global system.

In the Escape Analysis taught in Whaley and Rinard, one of the elements returned by the analysis is a single vector which includes an indication, for each parameter passed in, whether or not the parameter has (or could have) escaped the thread. In the present invention, the Escape Analysis used for the visibility analysis returns: a single result, indicating whether the region has written to any memory location other than local fields or fields of passed in parameters; a first vector of results equivalent to that returned by Whaley and Rinard; and a second vector of results for each parameter, indicating for each field whether the called method has written to the fields of each parameter passed in. The actual method of determining these additional results will be apparent to those of skill in the art.

This visibility analysis is interprocedural and the results returned for a called method are consolidated for the method and anything that the method calls, directly or indirectly. Thus the visibility analysis on first( ), in the example code fragment above, would include the results of the visibility analysis on dosomething( ).

One of the advantages of the present invention is the fact that it will identify neutral regions, i.e., regions which are not read or write regions, and will remove them from the locked regions of code where possible. For example, synchronization of one or more read regions which are followed by one or more neutral regions, or led by one or more neutral regions, will be reduced to synchronize only the one or more read regions. In other words, the neutral regions will be removed from consideration in this case so that the actual synchronized regions are reduced in size. Reducing the size of the actual regions which are synchronized provides advantages in that blocking of execution of other threads is reduced as the amount of code which is synchronized is reduced. Similarly, synchronization of one or more write regions which are followed by or led by one or more neutral regions will be reduced to synchronize only the one or more write regions.

However, as will be apparent, if one or more neutral regions are surrounded by read and/or write regions, the neutral regions cannot be removed from consideration. The actual means for ensuring semantic correctness of the removal of neutral regions from the consideration of synchronized regions of code are not particularly limited and will be apparent to those skilled in the art.

If a region, and all the regions it contains are read regions, or read and neutral regions, then that synchronized region is a read region. If the region or any region it contains, directly or indirectly, even a single write region, then that synchronized region and all regions it contains are write regions.

One potential remaining problem is that the high level source, or in the case of Java, the bytecodes, may not always be available for all methods employed in an application, such as methods written to the Java Native Interface (JNI) specification, and thus the visibility analysis cannot be performed for such methods and they must be presumed to be write methods. However, the present inventors contemplate that such JNI methods and other libraries of code can be dealt with in a variety of manners.

Other analytic techniques can be performed on such code to identify the visibility of the regions, i.e., whether regions of code therein are write regions, neutral regions or read regions. However, such other analytic techniques may not be suitable for inclusion in a JIT or other software tool, due to the length of time and resources they may require to execute. Further, it may be the case that only empirical analytic techniques will provide the necessary results. Accordingly, one method of dealing with such code, for which the bytecode or other source code is not available, is to perform analytic and/or empirical analysis of such code in advance to determine whether regions of the code are write regions, neutral regions or read regions. The resulting information, which identifies the nature of the regions in this code, can be passed to the JIT, or other software tool, for use. Thus, when an application being processed by the JIT or other software tool has threads which enter such code, the JIT or other software tool can consult the information regarding the previously determined nature of the code, which has been made available to the JIT or software tool in a suitable manner, to determine how the regions of code in these JNI methods or libraries should be handled.

As the present invention is deployed commercially, it is also contemplated that the authors of JNI methods and/or libraries will perform visibility analysis in accordance with the present invention on their source. The JNI methods and/or libraries can be created with information which can identify, to a JIT or other software tool in accordance with the present invention, the read, neutral or write status of the methods in the libraries. Thus, the JIT or other software tool can consider the information provided to it for methods in such JNI methods and/or libraries and the software tool will act accordingly. If information regarding the methods or libraries is not available to the software tool, the software tool must assume that any synchronized methods in the JNI methods or libraries are write methods.

The present invention also considers the read, neutral or write status of each region in a method. The present invention may thus provide execution efficiency improvements. For example, consider the first code fragment (region):

```
synchronized dosomething(inputargs){          1
    if (inputargs >test_value){                2
        real_work( );                          3
    }                                          4
}                                              5
``` wherein it is assumed that real_work( ) is a write region. Lines 1, 2, 4 and 5 are determined to be neutral regions and line 3 is determined to be a write region. In the analysis of Bogda and others the method containing this region would be a write method due to the write status of line 3 and access to the method would be blocked whether or not the test in line 2 is true.

In the present invention, tracking the read, neutral or write status of each region allows the software tool, such as a JIT, to effectively transform this region as if it was written as shown in this second code fragment:

```
dosomething(inputargs){
    if (inputargs >test_value){
        synchronized(this){
            real_work( );
        }
    }
}
```

Thus in the present invention, the machine code which is produced by the tool to implement dosomething( ) as shown in the first code fragment is produced as if dosomething( ) had been coded as shown in the second code fragment. As will be apparent, with this transformation, a thread executing this code only acquires a lock if the test of inputargs and test_value is true when the thread enters this region. It is believed that such transformation, based upon the per region analysis of the present invention, may result in a significant improvement to the execution performance of many Java and other applications.

The particular mechanism for moving the acquisition and release of a lock to permit this transformation is not particularly limited and can be achieved in a variety of manners as will be apparent to those of skill in the art. It is only necessary to ensure that a lock is acquired before any write region is entered and that the lock is released after all write regions have been completed. In a present embodiment of the invention, acquisition of the lock is performed at the lowest node of the control flow graph (CFG), of the method under consideration, which dominates every write region of the CFG and the release is performed at the highest node in the CFG which post-dominates every write region. While it is recognized that this technique may not be the most optimal, in that it may acquire locks somewhat before strictly necessary and may delay the release of locks somewhat after they could have been released, it is conservative in that it will always provide correct results (i.e., locks will be obtained by the time they need to be and locks will not be released before they should be) and it is relatively simple to implement. Other, more complex, techniques for obtaining and releasing locks in a more optimal manner can be employed without departing from the scope of the invention.

FIG. 1 shows a flowchart of the logical process employed in an embodiment of the present invention. The particular software tool used, in this example a JIT, executes in the conventional manner until the bytecode representation of the application has been processed, at step 100, to obtain an appropriate, for the software tool, internal representation of the code. At step 100, various other conventional tasks can have been performed by the software tool without departing from the scope of the invention, including code optimizations, etc.

Next, the software tool analyzes the internal representation of the code and produces a control flow graph at step 104. Suitable techniques and methods for producing control flow graphs for programs are well known to those of skill in the art. However, as part of creating the control flow graph, step 104 also identifies the entry and exit points of every synchronized region of the code.

At step 108, the software tool examines the basic blocks in the control flow graph which has been produced and determines which blocks are write blocks, which are neutral blocks and which are read blocks. In a present embodiment of the invention, this visibility analysis is performed using the augmented Escape Analysis discussed above, but any other suitable method can be employed for determining which blocks contain code whose effect will be visible to other threads when they are executed.

At step 112, the identified entry and exit points of synchronized regions are moved by the software tool to enclose the smallest set of blocks which can be achieved, without modifying the semantics of the original bytecode. Neutral regions are removed, where it is possible to do so without altering the semantics of the program, from the regions under consideration. Transformations, such as those described above with respect to conditional statements, are performed to further minimize the size of regions which are locked. In a present embodiment of the invention, this latter step is performed in a somewhat conservative manner, relying upon the use of a structured control flow and a structured control flow graph results after the movements have been made.

At step 116, a set of trees is constructed, each tree representing a unique nested set of regions which are synchronized, as determined in step 112.

At step 120, using the information determined in step 108, any tree in the set containing at least one region that is a write block, is marked as a write tree. All other trees are marked as read trees.

Finally, at step 124 appropriate write lock code is applied to regions whose trees have been identified as write trees and appropriate read lock code is applied to regions whose trees have been identified as read trees.

The program code can now be executed with the resulting required read and write locks.

Figure 2:
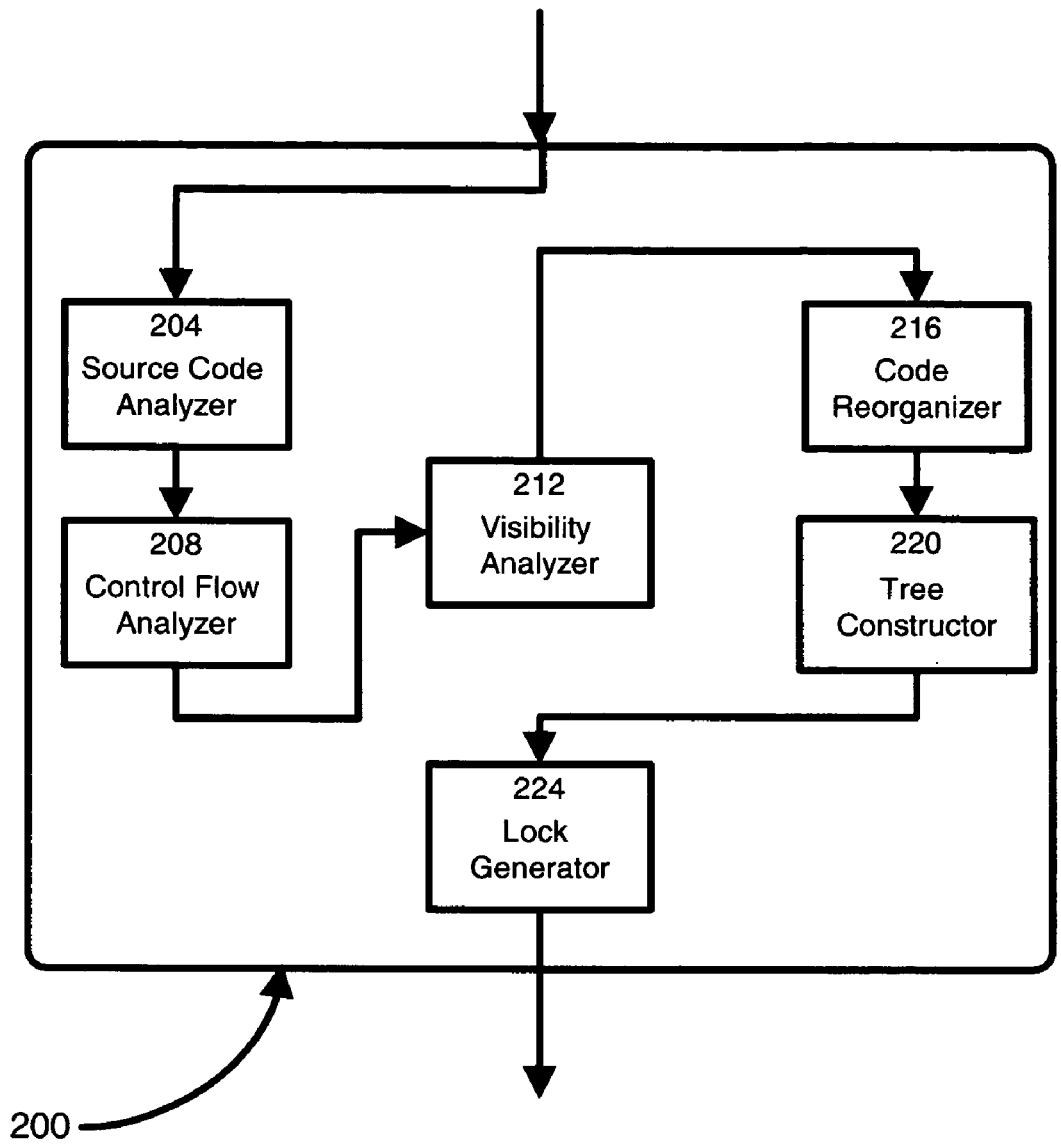
FIG. 2 shows a system in accordance with the present invention.

In FIG. 2, a system in accordance with an embodiment of the present invention is indicated generally at 200. As illustrated, a source program, such as a program in Java bytecodes, given to system 200 is first processed by an analyzer 204. Analyzer can be any suitable analyzer for examining higher level code and converting it to an appropriate internal representation for consideration by and processing on system 200, such as the known first pass of a compiler.

After the bytecode has been converted to an appropriate internal representation by analyzer 204, the results are passed to a control flow analyzer 208 which constructs a structured control flow graph for the program. In addition to constructing the control flow graph, the control flow analyzer identifies the entry and exit from each synchronized region of code.

Next, a visibility analyzer 212 examines the control flow graph, using Escape Analysis or any other suitable technique, to identify those blocks of code whose execution by a thread will be visible to other threads.

Next, the control flow graph is passed to a code reorganizer 216 which moves the entry and exit point of each synchronized region so that they enclose the least number of blocks in the control flow graph without altering the semantics of the original bytecode.

Next, a tree constructor and examiner 220 examines the synchronized regions and constructs a set of unique trees, one tree for each unique nesting of synchronized regions, each constructed tree including the synchronized code region and each region, if any, that the synchronized region contains.

Finally, a lock generator 224 considers each tree and determines if any region in the tree has been determined to be a write region. Each tree that has been determined to contain at least one write region is deemed to be a write tree and lock generator 224 creates write locks for all of the regions in each such tree. Each tree which does not contain any write regions is deemed to be a read tree, and lock generator 224 creates read locks for the regions in each such tree. Then, the program can be executed with the read locks and the write locks, in many circumstances providing blocking of fewer threads and for reduced periods of time and thus, better execution efficiency.

The present invention provides a method, system and product which provides for execution of threads in an application with potentially less waiting by those threads for release of memory locks. The invention provides for a software tool, such as a Just In Time compiler, to determine if regions of code are write regions or read regions. For read regions, a lock is implemented by the JIT which lets more than one thread read from the locked storage location. For write regions, or read and write regions, an exclusive lock is implemented by the JIT. The determination of read or write status is performed at the region level rather than at the method level, and this improved granularity can result in fewer write locks being implemented than would be the case with method-level analysis.

Further, locks for write regions whose execution is conditional can be implemented on that same conditional basis, providing a further level of granularity and potential improvement in execution of the threads. Reduction of the regions actually included within locks, for example removing neutral regions, is also performed.

Libraries and other executables for which bytecode information is not available can be analyzed by their authors/publishers in accordance with the present invention and information about the results of this analysis can be provided to the JIT, or other software tool, to indicate whether each synchronized method in the library is a write method, neutral method or a read method.

The above-described embodiments of the invention are intended to be examples of the present invention and alterations and modifications may be effected thereto, by those of skill in the art, without departing from the scope of the invention which is defined solely by the claims appended hereto.

We claim:

1. A method for identifying and executing synchronized read regions and synchronized write regions in programming languages that offer synchronization but which do not offer programmers means to explicitly distinguish between such regions, said method comprising the steps of:
    (i) processing code of the program with a software tool to convert the code to an internal representation for the software tool;
    (ii) constructing a control flow graph of code blocks which also identifies entry and exit points for each region of code subject to a lock;
    (iii) for each code block in the control flow graph, performing visibility analysis to identify any of the code blocks whose execution by a thread will be visible to other threads and any of the code blocks whose execution may examine fields of the synchronized objects;
    (iv) moving each determined entry and exit point to enclose a smallest set of code blocks subject to a lock which can be achieved without altering semantics of the code of the program;
    (v) creating a set of trees comprising a unique tree representing a unique nested set of synchronized regions;
    (vi) for each tree created in (v), if the tree contains at least one block identified in step (iii) then marking the tree a write tree and otherwise marking the tree a read tree; and
    (vii) creating a write lock for the regions in each tree identified as a write tree and creating a read lock for the regions in each tree identified as a read tree.

2. The method of claim 1, wherein the visibility analysis of said step (iii) is performed by an Escape Analysis technique.

3. The method of claim 1, wherein the programming language is JAVA and the lock is indicated via a synchronized keyword.

4. The method of claim 3, wherein said method is performed in a Just In Time compiler.

5. The method of claim 2, wherein said step (iii) further includes, for blocks upon which visibility analysis cannot be performed, checking for predetermined information similar to what would be obtained from visibility analysis and, if the information is present, identifying the block accordingly.

6. The method of claim 5, wherein the predetermined information is determined empirically.

7. The method of claim 5, wherein the predetermined information is determined by an author of the code for the block.

8. The method of claim 1, wherein said step (iv) further includes transforming code to move the lock for regions whose execution depends upon a conditional statement to a point after the conditional statement has been evaluated provided that the evaluation of the conditional statement does not require the use of any field of an object subject to the lock.

9. Computer readable code stored on computer usable medium for causing a computing system to provide write and read locks for threads in programs written in a language offering only an undifferentiated lock, said computer readable code comprising:
    computer readable program code means for causing the computer system to process source code of the program to convert the source code to code in an internal representation;
    computer readable program code means for causing the computer system to construct a control flow graph of code blocks which also identifies entry and exit points for each region of code subject to a combined read and write lock;
    computer readable program code means for causing the computer system to, for each block in the control flow graph, perform visibility analysis to identify write blocks and read blocks;
    computer readable program code means for causing the computer system to move each determined entry and exit point to enclose a smallest set of code blocks which can be achieved without altering semantics of the code of the program;

computer readable program code means for causing the computer system to create a set of trees uniquely representing nested sets of synchronized regions;

computer readable program code means for causing the computer system to mark each tree containing at least one identified write region a write tree and otherwise mark the tree a read tree; and computer readable program code means for causing the computer system to create write locks for the code regions in each tree identified as a write tree and to create read locks for the code regions in each tree identified as a read tree.

10. The computer readable code of claim 9, wherein the computer readable program code means for causing the computer system to perform visibility analysis implements Escape Analysis.

11. The computer readable code of claim 9, wherein the computer readable program code means for causing the computer system to move each determined entry and exit point further operates to move a lock for regions whose execution depends upon a conditional statement to a point after the conditional statement has been evaluated provided that the evaluation of the conditional statement does not require use of any field of an object subject to the lock.

* * * * *